US00RE34674E

United States Patent [19]

Beakley et al.

[11] E Patent Number: Re. 34,674

[45] Reissued Date of Patent: Jul. 26, 1994

[54] LINEAR MOTOR

[75] Inventors: Bruce E. Beakley; Thomas E. Flanders, both of Houston, Tex.

[73] Assignee: Trilogy Systems, Inc., Houston, Tex.

[21] Appl. No.: 711,637

[22] Filed: Jun. 6, 1991

Related U.S. Patent Documents

Reissue of:

[64] Patent No.: 4,839,543
Issued: Jun. 13, 1989
Appl. No.: 152,315
Filed: Feb. 4, 1988

[51] Int. Cl.[5] ..... H02K 41/02
[52] U.S. Cl. ..... 310/12; 318/135
[58] Field of Search ..... 310/12, 13, 14; 318/135

[56] References Cited

U.S. PATENT DOCUMENTS

| | | | |
|---|---|---|---|
| 4,151,447 | 4/1979 | Von der Heide et al. | 318/135 |
| 4,220,899 | 9/1980 | Von der Heide | 318/135 |
| 4,318,038 | 3/1982 | Munehiro | 318/135 |
| 4,408,138 | 10/1983 | Okamoto | 310/12 |
| 4,408,145 | 10/1983 | Artemenko et al. | 318/135 |
| 4,427,740 | 1/1984 | Stackhouse et al. | 428/324 |
| 4,460,855 | 7/1984 | Kelly | 318/135 |
| 4,496,923 | 1/1985 | Lenzing | 336/59 |
| 4,542,312 | 9/1985 | Kawamura | 310/13 |
| 4,560,911 | 12/1985 | Chitayat | 318/135 |
| 4,603,270 | 7/1986 | Van Davelaar | 310/13 |
| 4,625,132 | 12/1986 | Chitayat | 310/13 |
| 4,631,430 | 12/1986 | Aubrecht | 310/12 |
| 4,631,431 | 12/1986 | Viskochil | 310/13 |
| 4,633,108 | 12/1986 | Von der Heide | 310/12 |
| 4,636,667 | 1/1987 | Holzinger et al. | 310/13 |
| 4,641,065 | 2/1987 | Shibuki et al. | 318/135 |
| 4,749,921 | 7/1988 | Chitayat | 318/135 |

FOREIGN PATENT DOCUMENTS

| | | |
|---|---|---|
| 0054863 | 3/1983 | Japan . |
| 547932 | 5/1977 | U.S.S.R. . |

OTHER PUBLICATIONS

Anorad Corp., Anoline Linear Brushless Servo Motors brochure, printed Apr. 1986.

*Primary Examiner*—Steven L. Stephan
*Assistant Examiner*—Judson H. Jones
*Attorney, Agent, or Firm*—Pravel, Hewitt, Kimball, Krieger

[57] ABSTRACT

A moving coil linear motor having a central row of alternating, permanent magnets, with multi-phase, multi-pole coil assemblies located on both sides of the magnet row. Magnetic circuit completion material is located approximately the same height as the magnets and outside the coil assemblies. The coil assemblies are formed of a series of individual coils connected in a multi-phase, multi-pole relationship. At locations other than the coil assembly ends, the individual coils of a phase are adjacent and connected so that a current passes through them in a uniform direction. The individual coil total width is equal to the distance from a point on a magnet to the same point on the adjacent magnet, with the individual coil thickness being the total width divided by twice the number of phases. The coil assembly is coated with an epoxy to improve thermal mass and thermal conductivity and a phenolic to resist abrasion and the environment.

40 Claims, 5 Drawing Sheets

LINEAR MOTOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to linear motors, especially those linear motors which have moving coils.

2. Description of the Prior Art

Linear drives are used in many areas, including automation and robotic positioning systems, printers and disk drive units. Early designs often used lead screws or rack and pinion drives to provide the linear movement. Lead screws are generally limited to low speeds and low accelerations, have backlash between the ball nut and the screw, require periodic maintenance and require larger screw diameters as the length of travel increases. Rack and pinion drives are often speed and acceleration limited and contain backlash. Where zero backlash was required in these sorts of units, elaborate anti-backlash techniques and apparatuses were developed to resolve the problem, but these techniques added further maintenance and adjustment problems.

To overcome some of these problems, linear motors were developed. One type of linear motor is the linear stepper motor, which is the equivalent of a rotary stepper motor. Linear stepper motors overcame the problems of low speeds and accelerations, but only when moving very small loads, because the static force developed by linear stepper motors is typically on the order of ten pounds or less. In certain applications, this static force output is insufficient to overcome the static and dynamic friction created by the load. In addition, an air gap between the forcer, corresponding to the rotor, and the platen, corresponding to the stator, needs to be rigidly maintained with small variations, requiring strict manufacturing tolerances of the bearing or support system and resulting in high maintenance needs.

A second type of linear motor is the moving magnet motor. These motors incorporate a series of stacked ferromagnetic laminations with the wire forming the coils wound integrally into the laminations. These motors are the linear equivalent of standard rotary, brush type direct current motors. The linear slider, corresponding to the rotor, incorporates several permanent magnets, and is held a fixed air gap away from the laminations, corresponding to the stator. This air gap is generally larger than that of the linear stepper motors, reducing to some extent the manufacturing tolerances and bearing or support system maintenance requirements. These motors are abe to produce very large forces, up to 1,000 pounds, but have several problems. The force from the stacked lamination motors varies as they travel, due to a ripple effect or interaction between the wire, the laminations, and the permanent magnets and their various alignments. The magnets are often skewed or angled with respect to the laminations to help reduce this ripple force, but this angling does not eliminate the problem. Additionally, there is a very large attractive force between the slider and the laminations, often two to two and a half times as great as the linear or drive force being generated. This large attractive load between the slider and the laminations results in a much more complicated bearing system because of these forces and the need to maintain the air gap against these large attractive forces. Additionally, the motor length is generally limited to less than three feet because of problems maintaining the laminations at the required flatness, with joining of additional segments not easily performed.

Yet another type of linear motor is the moving coil linear motor. These can be either brushed or brushless designs and have a moving coil passing through an air gap created by either two rows of permanent magnets and magnetic circuit completion means or back iron or one row of permanent magnets and a magnetic circuit completion means using one back iron and one ferromagnetic bar. While there are large attractive forces between the two rows of magnets or the row of magnets and the magnetic circuit completion means, the air gap is maintained by the use of steel or aluminum bars to support the magnets and the magnetic circuit completion means. In addition, the force on the moving coil assembly is generally very low in directions other than the intended direction of movement because in many cases there is no ferromagnetic material located in the coil. In most cases, the coil assembly contains aluminum support materials which are not attracted by the magnets, but are subjected to induced eddy currents during the motion of the moving coil. This eddy current development acts as a small negative force proportional to the speed of travel and so reduces the efficiency of the motor.

However, the moving coil windings in these motors are generally the limiting factor to the force that can be developed because of heat buildup in the windings. The linear force developed is proportional to the current passing through the windings, the number of turns of wire and the flux density of the magnetic circuit. Given a constant flux density and a given number of windings, force is then directly proportional to the current in the windings. At the same time, power used or heat needed to be dissipated is proportional to the current squared and therefore the heat developed builds up at a rate much greater than the increase in force. This generally results in a current limitation in the coils being required to prevent overheating of the coil assembly.

The prior art moving coil linear motor designs were not conducive to heat removal because the coil assemblies were generally only air-cooled and had poor heat sinking of the coil assemblies. Additionally, the permanent magnets used in the motors were often quite expensive because of the combination of the high flux densities desired and the number of magnets required per given length to develop those densities.

It is desirable to have a linear motor which develops large accelerations, static force and speeds and yet does not have any ripple effects, does not require large numbers of expensive magnets and does not have coil assemblies which easily overheat.

U.S. Pat. No. 4,318,038 a moving coil linear motor which has two rows of alternating magnets with a moving coil assembly located on a central ferromagnetic bar. The central ferromagnetic bar is located between the two rows of magnets to form two sets of magnetic circuits. The use of two different coils or poles is stated to result in a reduced danger of the coils being burnt and overheated in use.

U.S. Pat. No. 4,151,447 discloses a linear motor utilizing one or two rows of alternating, permanent magnets affixed to a ferromagnetic, U-shaped bar which supports the magnets and provides the necessary ferromagnetic material for magnetic circuit completion. A series of coils is located between the magnets and energized to cause the coils to move. The coil faces are preferably parallel to the direction of movement of the coil assembly.

U.S. Pat. No. 4,641,065 discloses a moving coil linear motor having a single row of alternating, permanent magnets with a backing iron and an opposing ferromagnetic bar to form a closed magnetic circuit. A coil couple of given dimensions relative to the magnets is used to produce the linear force. The coils form a U shape around the magnets to reduce the total magnetic circuit air gap. The motor commutation is provided by various arrangements of brushes, contacts or optical sensors to simply commutate the coils or to allow development of an alternating current output providing position and speed feedback.

U.S. Pat. No. 4,460,855 discloses a multi-pole, multiphase, moving coil linear motor. The coil assembly is formed on a cylindrical object located around a cylindrical magnet series. The magnets are arranged in an alternating pole sequence with gaps of approximately the magnet length between adjacent magnets. It is specifically indicated that there are no laminations in the coil assembly, resulting in a lightweight armature. Position feedback can be developed by use of a light source, a photocell and a graticle and appropriate electronic circuitry.

U.S. Pat. No. 4,220,899 discloses a cylindrical linear motor. A central, laminated, ferromagnetic cylinder used for magnetic circuit completion has multi-pole, multi-phase coils wound around it. The structure is encircled by a series of permanent magnets. The magnets are closely encircled by an equivalent to the standard back iron. Various commutation and drive methods are disclosed.

U.S. Pat. No. 4,408,138 discloses a linear stepper motor having one set of fixed magnets and a series of stepper windings positioned in a lamination body having varying sizes of teeth.

U.S. Pat. No. 4,560,911 discloses a linear motor for use with a positioning table. It is disclosed that the motor uses one set of permanent magnets and one set of coil pairs, either of which can be moving while the other is held in fixed location. The fixed assembly can have a series of sets or poles. The motor uses brushes to change the voltage being applied to the coils to provide for movement of the motor. The coils are located in a toothed arrangement with laminations.

SUMMARY OF THE PRESENT INVENTION

A linear motor according to the present invention utilizes a central row of permanent magnets having alternating pole alignments. The magnets are developed so that they have the magnetic poles on their faces. A pair of multi-phase, multi-pole coil assemblies are located on either side of the magnet row for intersecting the flux produced by the magnets. The magnetic circuit is completed by having ferromagnetic materials located outside of the coil assemblies.

The coil assemblies are developed by using multiple phases and multiple poles so that in areas other than the end of the coil assembly, the coil assemblies are primarily formed of the wire forming the individual coils, with no ferromagnetic laminations or other metallic materials located in the active magnetic area of the coil assembly. The wire forming the coils is potted with an epoxy to provide the stiffness and strength required to develop and retain the basic coil form while improving thermal conductivity and increasing thermal mass, with an outer phenolic layer being applied for complete covering and protection from the environment and from the other portions of the motor. There is an aluminum heat conducting and mounting plate affixed to the top of the coil assembly and outside of the magnetic circuit to allow good mechanical and thermal connection between the coil assembly and the table or device to be moved. The coil assemblies are substantially located in a plane parallel to the magnet row with the ends of the coil loops being bent such that the height of the motor is at a minimum.

While the magnetic flux developed between the magnet row and a single magnetic circuit completion means is less than that developed in a design having two rows of magnets, the use of dual coil assemblies on both sides of the magnet row doubles the amount of force that can be provided from a given magnetic flux, given constant current and number of turns intersecting the flux. Therefore, fewer magnets can be used while increasing the amount of force that can be supplied for a given flux density.

As a result of the present invention, the cost of a linear motor for a given force output is decreased due to the decreased number of magnets required and because of the improved magnetic flux coupling due to the adjacent location of the coil loops. The linear motor efficiency is further increased because the coil assembly is essentially entirely active material with no other force-reducing gaps or magnetic or electrical conducting materials interposed.

DETAILED DESCRIPTION OF THE PREFERRED EMBODIMENT

Figure 1:
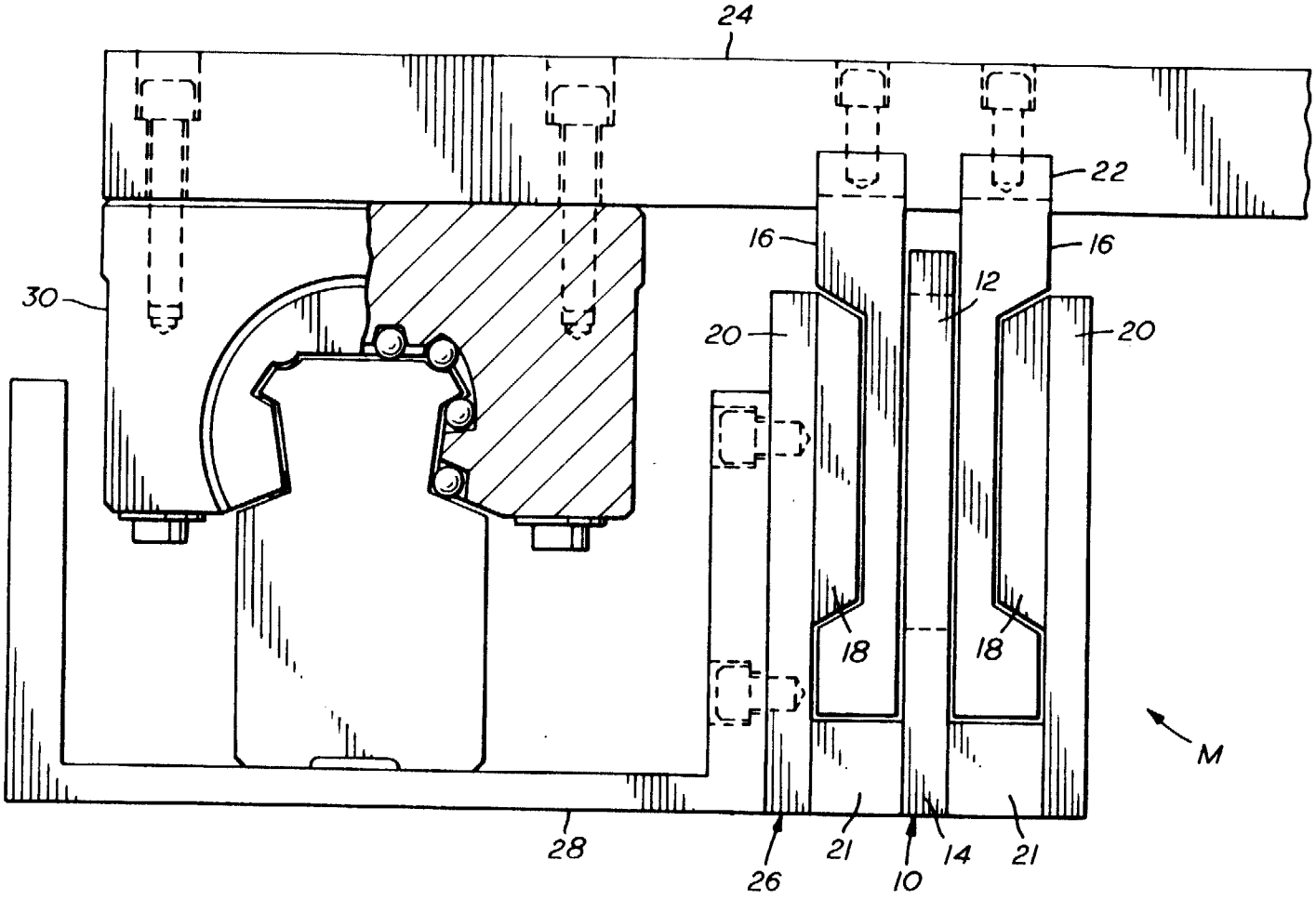
FIG. 1 is an end view in partial cross-section of a linear motor according to the present invention mounted to a moving and stationary table.

Referring now to FIG. 1, the letter M generally represents a linear motor according to the present invention. The motor M has a central magnet row 10 formed by placing a series of individual magnets 12 into a retaining bar 14. The magnets 12 need to be only so thick as are necessary for mechanical purposes. The flux output of the magnets 12 depends upon the thickness, but increasing the magnet thickness does not yield a proportionate increase in flux. The thickness selected for a particular application generally depends on the force desired. The magnets 12 may be coated with a corrosion-resistant material such as epoxy, for example. The magnet retaining bar 14 is preferably made of aluminum so that it is non-magnetic and reduces the weight of the structure. The magnet holding bar 14 preferably has an anodic protective coating to prevent corrosion. The magnets 12 and the magnet retaining bar 14 are preferably flush to provide a smooth and continuous surface.

Positioned on either side of the magnet bar 10 are coil assemblies 16. Located outside of the coil assemblies 16 and on each side of the magnet bar 10 is a magnetic circuit completion material 18, preferably steel or other ferromagnetic material. The circuit completion material 18 is held in position by a retaining material 20, preferably aluminum, of sufficient strength to oppose the magnetic attraction forces between the magnetic material 18 and the magnets 12. The magnetic material 18 should preferably be as high as the magnets 12 to prevent flux from escaping, and also to reduce the fringe effects in the volume occupied by coil assemblies 16. The magnetic circuit completion material 18 is preferably coated with a protective plating to prevent corrosion. The retaining material 20 is spaced from the magnet retaining bar 14 by spacers 21, also preferably formed of aluminum for weight-saving reasons.

Each of the coil assemblies 16 preferably includes a heat transfer and mounting plate 22, preferably formed of aluminum, which provides heat sinking capability and by which the coil assemblies 16 are attached to a moving table 24. The moving table 24 or platform is the actual item which is moved in the linear direction and can, for example, be a platform containing a robot or other assembly apparatuses, and could include, for example, an attachment to a head for reading from various magnetic or optical storage materials.

The magnet row 10 and magnetic circuit material 18 form a stationary assembly 26 which is attached to the fixed or stationary table 28. The moving table 24 and the fixed table 28 are connected and held in proper location by means of a linear bearing 30 which provides the necessary lateral support to keep a coil assembly 16 from rubbing either the magnet row 10 or the magnetic circuit material 18. The linear bearing 30 can be any of several designs as necessary based on the weights to be supported on and moved by the moving table 24 and the length of the various movements expected. Numerous bearings 30 can be utilized if necessary.

Figure 2:
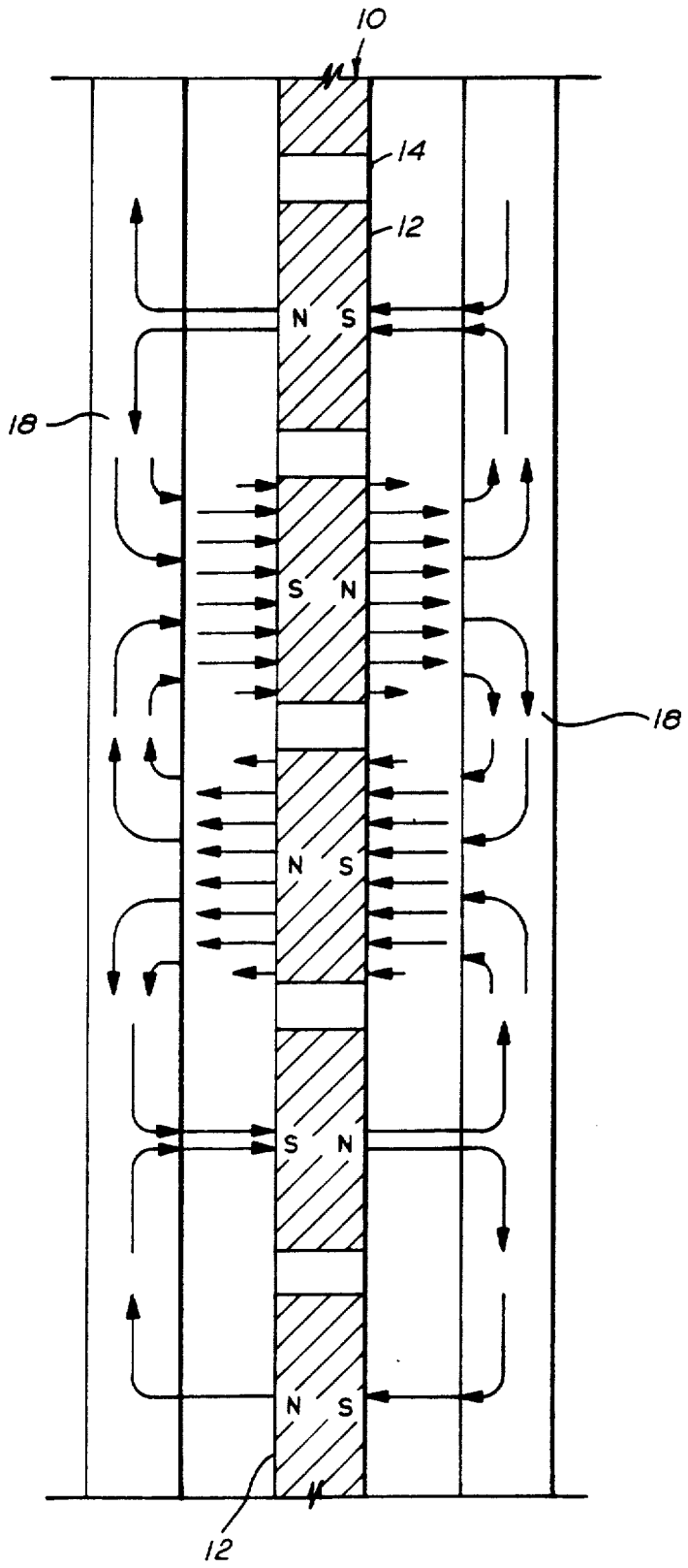
FIG. 2 is a schematic view indicating the magnetic circuit of a motor according to the present invention.

The magnets 12 are placed in the magnet row 10 in an alternating arrangement so that adjacent magnets have opposite poles facing the coil assemblies 16 and the magnetic material 18 (FIG. 2). In this manner, the flux lines from the magnets 12 traverse the gap to the magnetic circuit material 18. The magnets 12 are preferably high energy product, permanent rare earth magnets such as, for example, samarium cobalt or neodymium-iron-boron magnets. The magnetic material 18 should generally be of sufficient thickness to capture essentially all of the magnetic flux produced by the magnets 12, but magnetic material 18 beyond a given thickness does not further benefit the magnetic circuit. The magnetic circuit completion material 18 is preferably beveled as shown in FIG. 4 to allow more room for and less stress on the individual coils 32 (FIG. 5) forming the coil assemblies 16.

Figure 3:
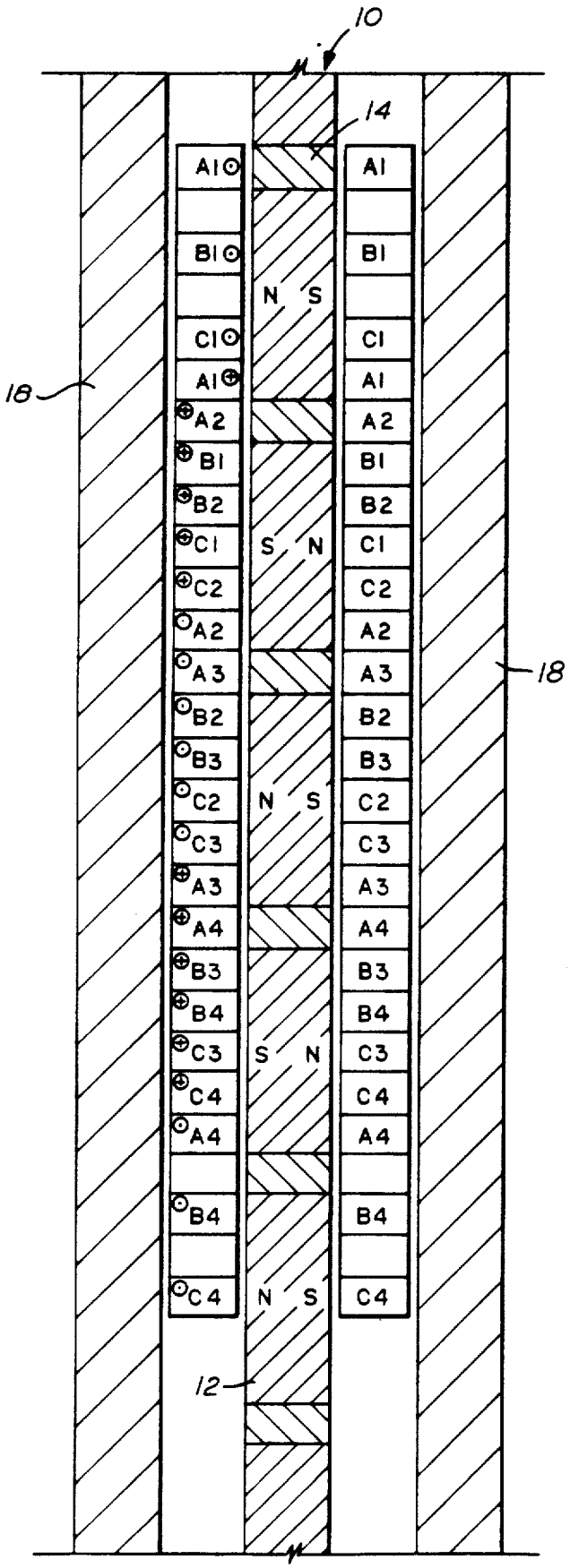
FIG. 3 is a schematic top view of a linear motor according the present invention showing the magnet and coil phase and pole relationships.
Figure 5:
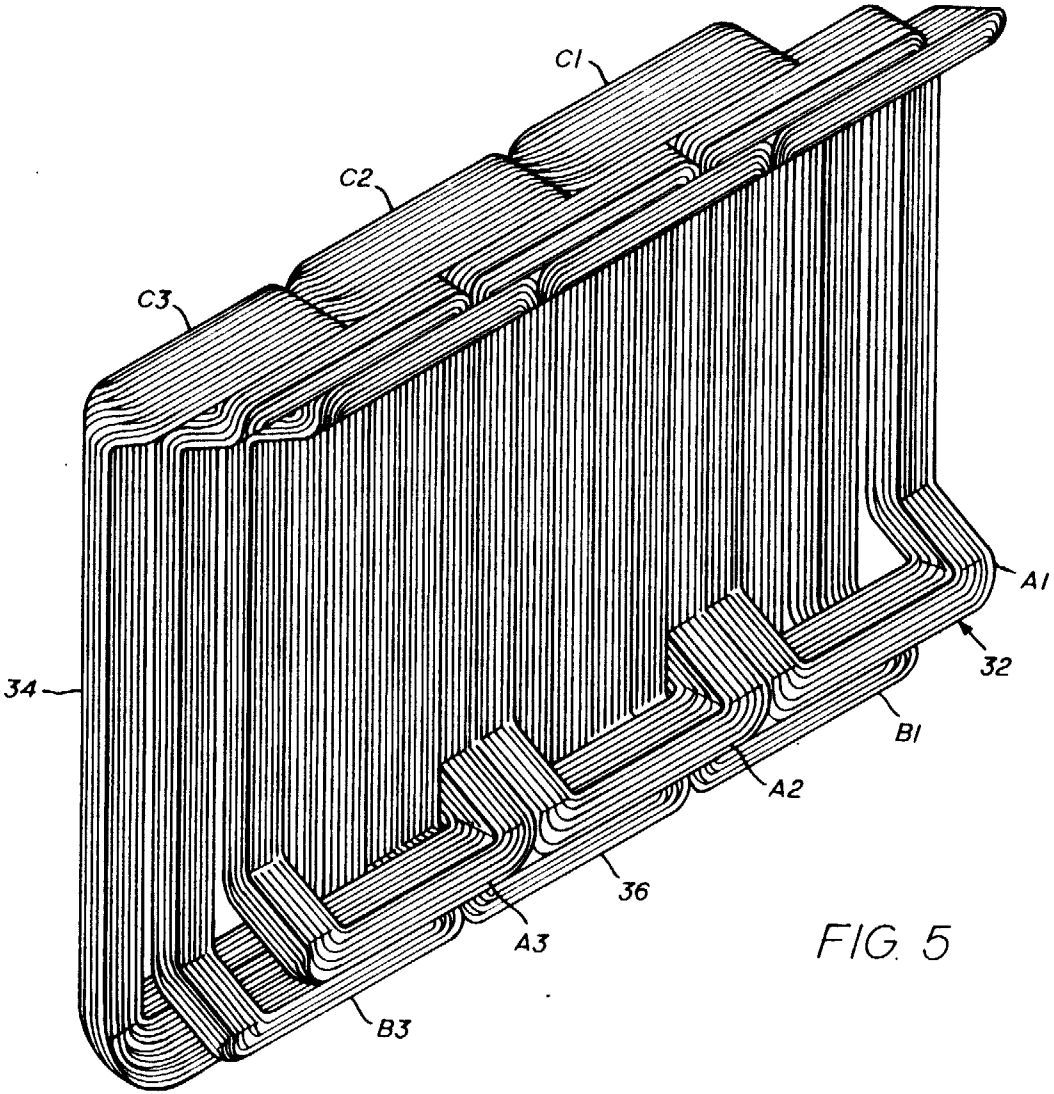
FIG. 5 is a perspective view of the coil assembly according to the present invention, prior to coating the individual coils.

The coil assemblies 16 are formed of a plurality of individual coil loops 32. The individual coil loops 32 are generally oval in shape and have sides 34 and ends 36. The sides 34 are generally perpendicular to the longitudinal axis of the magnet bar 10, while the ends 36 are generally parallel to the longitudinal axis of the magnet bar 10. The coils 32 are preferably connected in a multi-phase, multi-pole arrangement as shown in FIGS. 3 and 5. The letters A, B and C generally refer to the different phases of coils 32 in the coil assembly 16 and the numbers 1, 2, 3 and 4 refer to different poles in each phase. The outside width of an individual coil 32 is the distance from one portion of a magnet 12 to the same portion of the adjacent magnet 12. The thickness of an individual coil 32 is approximately the total coil width divided by the number of phases divided by two. This is shown in FIG. 3 and in FIG. 5 where it is indicated that the loops of adjacent poles of a single phase are adjacent. This width of the individual coils 32 results in the coil assembly 16 being formed primarily of the wire forming the coils 32, generally an enameled copper wire as is common in motors and transformers. There are preferably no laminations, steel or other ferromagnetic materials located in the coil assembly 16. There are preferably no conductive materials other than the coil wire located in the active area of the coil assembly 16. The height of the coil sides 34 is approximately the height of the magnets 12 for maximum interaction between the coil magnetic field and the magnetic flux produced by the magnets 12. The magnets 12 are preferably spaced approximately 0.2 times their width apart. The preferred coil width is about 1.2 times the magnet width, with the coil thickness being preferred to be about 0.2 times the magnet width for a three phase coil assembly 16.

The individual coils 32 are wound and connected such that a current passes through adjacent individual coil portions of the same phase in the same direction to produce a uniform magnetic field. For instance, the current in loops A1, adjacent A2, adjacent B1, adjacent B2, adjacent C1, and adjacent C2, flows in the same direction, forming a magnetic field the full width of a magnet and the inter-magnet spacing.

Figure 4:
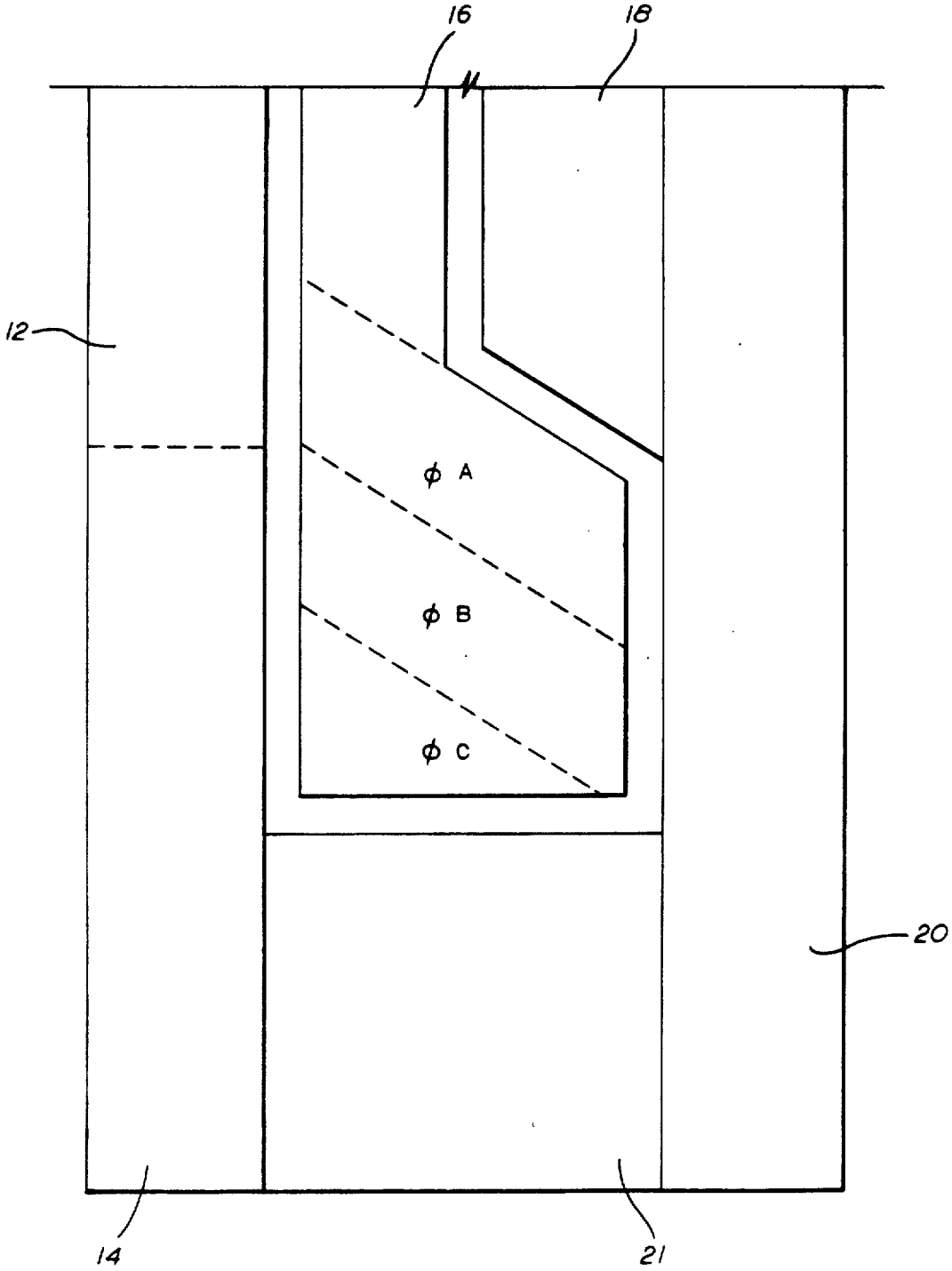
FIG. 4 is an enlarged partial end view of portions of the linear motor of FIG. 1.

To minimize the air gap between the magnets 12 and the magnetic circuit material 18, the bending of the coil ends 34 is done in a space below the magnets 12 (FIG. 4). The coils 32 are formed in an unbent form and then bent to have the ends located generally in the areas shown as areas $\phi A$, $\phi B$, and $\phi C$. This stacked end relationship allows the coils 32 to be easily and separately wound and minimizes the air gap required in the motor M, while reducing the stress on the coil wire.

After the individual coil phases have been bent in the appropriate coil forms to their final shape, they are placed together and coated with, for example, an epoxy material. The epoxy material provides the primary means of holding the coils in their desired shape, both in terms of the bends and in terms of the phase and pole relationships. The epoxy material is preferably a high thermal conductivity material. The presence of the epoxy material increases the thermal mass of the coil assemblies 16, so that high forces and high currents can be developed for short periods of time without the coil assembly 16 overheating. The high thermal conductivity of the epoxy material allows the heat to be better transferred from the coils 32 through the epoxy material to the aluminum heat transfer and mounting plate 22. In this way, higher continuous loads and currents can be obtained from the motor M, because of the improved heat transfer materials and arrangement provided.

The coil assemblies 16 preferably have an outer coating formed of a resin, such as a phenolic resin, and a paper backing. Because the epoxy material generally does not cover the entire surface area of the individual coils 32, it is desirable to have an additional environmental shield to prevent any mechanical interference from eroding a wire in an individual coil 32 into two pieces, thereby rendering the particular phase unusable, and to provide a further shield from any corrosive materials which may be present in industrial environments. The coil assemblies 16 are coated with this resin and paper to form a phenolic or a hard, rigid, abrasion-resistant outer surface to improve the wear properties of the coil assemblies 16.

Control of the voltages and currents supplied to the coil assemblies 16 can be done using conventional brushless amplifiers with commutation and/or feedback being controlled by Hall effect devices, magnetic encoders, optical encoders and other methods known to those skilled in the art. The multiple phases used in the motor M, when combined with a sufficiently high resolution position indication method, allows the controller to produce a sinusoidal waveform to the coil assemblies 16 such that a very smooth and low ripple force movement results.

One advantage of a motor according to the present invention is that it can be made in unitary lengths and easily combined end-to-end to allow various numbers of magnet bars 10 and coil assemblies 16 to be stacked to allow the development of varying lengths and varying forces as desired.

One example of the motor M used neodymium-iron-boron magnets 12 having an energy product of 34 Mega-gauss-oersteds. The magnet bar 10 was approximately 24 in. in length by 3 in. high by 0.25 in. thick and contained twenty magnets 12. The coil assemblies 16 were developed for three phase operation and had four poles each, resulting in an approximate 10.5 in. standard length. The static force provided by this motor M was approximately 80 pounds with a coil input current limited at 10 amps. A velocity of over 100 inches per second was obtained.

The foregoing disclosure and description of the invention are illustrative and explanatory thereof, and various changes in the size, shape and materials, as well as in the details of the illustrative construction may be made without departing from the spirit of the invention, all such changes being contemplated to fall within the scope of the appended claims.

We claim:

1. A linear motor, comprising:

a plurality of magnets aligned in a row forming a magnet plane and having a longitudinal axis, said magnets aligned with alternating pole orientations on the faces of said magnet plane;

first and second coil assemblies, each coil assembly located substantially in a plane substantially parallel to said magnet plane and on opposite sides of said magnet row, each of said coil assemblies formed of a plurality of individual coil loops having sides and ends, said loop sides being substantially perpendicular to the magnet row longitudinal axis and said loop ends being substantially parallel to the magnet row longitudinal axis, said individual coil loops connected to form at least two phases and at least two poles per phase; and first and second magnetic circuit completing means, each means located in a plane substantially parallel to said magnet plane and located outside of said coil assemblies.

2. The linear motor of claim 1, wherein said individual coil loop side thickness is approximately said individual coil loop total width divided by two tines the number of phases and wherein at least one individual coil loop forming a pole of a phase overlaps portions of said individual coil loops forming two poles of each other phase.

3. The linear motor of claim 1, wherein said individual coil loops side thickness is approximately the individual coil loop total width divided by two times the number of phases and wherein at locations other than the end of said coil assemblies, one side of an individual coil loop is located directly adjacent one side of another individual coil loop of the same phase.

4. The linear motor of claim 3, wherein said individual coil loops are connected so that an electric current passed through said individual coil loops of a phase is of the same polarity in adjacent individual coil loop sides.

5. The linear motor of claim 1, wherein said magnets are separated by a distance approximately equal to an individual coil loop side thickness.

6. The linear motor of claim 1, wherein said individual coil loop side length is approximately the same as the height of said magnets.

7. The linear motor of claim 6, wherein said magnetic circuit completing means height is approximately the same as the height of said magnets.

8. The linear motor of claim 1, wherein the ends of at least one phase of said individual coils loops form a plane angled from said magnet plane.

9. The linear motor of claim 8, further comprising:

support means for said magnetic circuit completing means, said magnetic circuit completing means being located over said angled coil ends.

10. The linear motor of claim 1, wherein said coil assembly includes enameled wire forming the individual coil loops and an electrically nonconducting material, said nonconducting material providing the structural support for retaining the shape of said individual coil loops.

11. The linear motor of claim 10, wherein said coil assembly further includes a phenolic resin and paper coating.

12. The linear motor of claim 11, wherein said coil assembly further includes a metallic plate for attachment to an external material for improving heat exchange capabilities.

13. The linear motor of claim 1, further comprising:

support means for said magnetic circuit completion means.

14. The linear motor of claim 13, further comprising support means for said magnets.

15. The linear motor of claim 14, when said magnet support means and said magnetic circuit completion means support means are connected.

16. The linear motor of claim 1, wherein there is no electrically conductive material in the volume inside said coil loops other than the wire forming said coil loops.

*17. A linear motor, comprising:*

*a plurality of magnets aligned in a row forming a magnet plane and having a longitudinal axis, said magnets aligned with alternating pole orientations on the faces of said magnet plane;*

*a coil assembly located substantially in a plane substantially parallel to said magnet plane;*

*said coil assembly being formed of a plurality of individual coil loops having sides and ends, said loop sides being substantially perpendicular to the magnet row longitudinal axis and said loop ends being substantially parallel to the magnet row longitudinal axis, said individual coil loops connected to form at least two phases and at least two poles per phase; and*

*a magnetic circuit completing means located in a plane substantially parallel to said magnet plane and said coil assembly;*

*wherein said individual coil loop thickness is approximately said individual coil loop total width divided by two times the number of phases and wherein at least one individual coil loop forming a pole of a phase overlaps portions of said individual coil loops forming two poles of each other.*

*18. A linear motor comprising:*

*a plurality of magnets aligned in a row forming a magnet plane and having a longitudinal axis, said magnets aligned with alternating pole orientations on the faces of said magnet plane;*

*a coil assembly located substantially in a plane substantially parallel to said magnet plane,*

*said coil assembly being formed of a plurality of individual coil wire loops having sides and ends, said loop sides being substantially perpendicular to the magnet row longitudinal axis and said loop ends being substantially parallel to the magnet row longitudinal axis, said individual coil loops connected to form at least two phases and at least two poles per phase; and*

*a magnetic circuit completing means located in a plane substantially parallel to said magnet plane and said coil assembly,*

*wherein there is no electrically conductive material in the volume inside said coil loops other than the wire forming said coil loops.*

*19. The linear motor of claims 17 or 18, wherein at locations other than the end of said coil assemblies one side of an individual coil loop is located directly adjacent one side of another individual coil loop of the same phase.*

*20. The linear motor of claim 19, wherein said individual coil loops are connected so that an electric current passed through said individual coil loops of a phase is of the same polarity in adjacent individual coil loop sides.*

*21. The linear motor of claims 17 or 18, wherein said magnets are separated by a distance approximately equal to an individual coil loop side thickness.*

*22. The linear motor of claims 17 or 18, wherein said individual coil loop side length is approximately the same as the height of said magnets.*

*23. The linear motor of claim 22, wherein said magnetic circuit completing means height is approximately the same as the height of said magnets.*

*24. The linear motor of claims 17 or 18, wherein the ends of at least one phase of said individual coil loops form a plane angled from said magnet plane.*

*25. The linear motor of claim 24, further comprising:*

*support means for said magnetic circuit completing means, said magnetic circuit completing means being located over said angled coil ends.*

*26. The linear motor of claims 17 or 18, wherein said coil assembly includes enameled wire forming the individual coil loops and an electrically nonconducting material, said nonconducting material providing the structural support for retaining the shape of said individual coil loops.*

*27. The linear motor of claim 26, wherein said coil assembly further includes a phenolic resin and paper coating.*

*28. The linear motor of claim 27, wherein said coil assembly further includes a metallic plate for attachment to an external material for improving heat exchange capabilities.*

*29. The linear motor of claims 17 or 18, further comprising:*

*support means for said magnetic circuit completion means.*

*30. The linear motor of claim 29, further comprising support means for said magnets.*

*31. The linear motor of claim 30, wherein said magnet support means and said magnetic circuit completion means support means are connected.*

*32. A coil assembly for a linear motor, the linear motor including a plurality of magnets aligned in a row forming a magnet plane and having a longitudinal axis, the magnets aligned with alternating pole orientations on the faces of the magnet plane, the coil assembly comprising:*

*a plurality of individual coil loops having sides and ends, said loop sides being substantially perpendicular to the magnet row longitudinal axis and said loop ends being substantially parallel to the magnet row longitudinal axis, said individual coil loops connected to form at least two phases and at least two poles per phase;*

*wherein said individual coil loop thickness is approximately said individual coil loop total width divided by two times the number of phases and wherein at least one individual coil loop forming a pole of a phase overlaps portions of said individual coil loops forming two poles of each other phase.*

*33. A coil assembly for a linear motor, the linear motor including a plurality of magnets aligned in a row forming a magnet plane and having a longitudinal axis, the magnets aligned with alternating pole orientations on the faces of the magnet plane, the coil assembly comprising:*

*a plurality of individual coil wire loops having sides and ends, said loop sides being substantially perpendicular to the magnet row longitudinal axis and said loop ends being substantially parallel to the magnet row longitudinal axis, said individual coil loops connected to form at least two phases and at least two poles per phase;*

*wherein there is no electrically conductive material in the volume inside said coil loops other than the wire forming said coil loops.*

*34. The coil assembly of claims 32 or 33, wherein at locations other than the end of the coil assembly, one side of an individual coil loop is located directly adjacent one side of another individual coil loop of the same phase.*

*35. The coil assembly of claim 34, wherein said individual coil loops are connected so that an electric current passed through said individual coil loops of a phase is of the same polarity in adjacent individual coil loop sides.*

*36. The coil assembly of claims 32 or 33, wherein said individual coil loop side length is approximately the same as the height of said magnets.*

*37. The coil assembly of claims 32 or 33, wherein the ends of at least one phase of said individual coil loops form a plane angled from said magnet plane.*

*38. The coil assembly of claims 32 or 33, wherein the coil assembly includes enameled wire forming the individual coil loops and an electrically nonconducting material, said nonconducting material providing the structural support for retaining the shape of said individual coil loops.*

*39. The coil assembly of claim 38, wherein the coil assembly further includes a phenolic resin and paper coating.*

*40. The coil assembly of claim 39, wherein the coil assembly further includes a metallic plate for attachment to an external material for improving heat exchange capabilities.*

* * * * *